(12) United States Patent
Oomori

(10) Patent No.: US 9,647,506 B2
(45) Date of Patent: May 9, 2017

(54) MOTOR AND METHOD FOR MANUFACTURING MOTOR

(71) Applicant: ASMO CO., LTD., Shizuoka-ken (JP)

(72) Inventor: Shingo Oomori, Toyohashi (JP)

(73) Assignee: ASMO CO., LTD., Shizuoka-ken (JP)

( * ) Notice: Subject to any disclaimer, the term of this patent is extended or adjusted under 35 U.S.C. 154(b) by 438 days.

(21) Appl. No.: 14/480,168

(22) Filed: Sep. 8, 2014

(65) Prior Publication Data

US 2015/0076957 A1 Mar. 19, 2015

(30) Foreign Application Priority Data

Sep. 18, 2013 (JP) ................... 2013193151

(51) Int. Cl.
| | |
|---|---|
| *H02K 5/14* | (2006.01) |
| *H01R 39/38* | (2006.01) |
| *H02K 5/04* | (2006.01) |
| *H02K 5/22* | (2006.01) |
| *H02K 7/116* | (2006.01) |
| *H02K 15/12* | (2006.01) |
| *H02K 11/38* | (2016.01) |

(52) U.S. Cl.
CPC ............. *H02K 5/04* (2013.01); *H02K 5/148* (2013.01); *H02K 5/225* (2013.01); *H02K 7/1166* (2013.01); *H02K 11/38* (2016.01); *H02K 15/12* (2013.01); *H01R 39/383* (2013.01)

(58) Field of Classification Search
CPC .. H02K 5/04; H02K 5/14; H02K 5/22; H02K 7/1163; H02K 7/1166; H02K 11/38; H02K 13/00; H02K 15/14; H01R 39/383; H01R 39/38; H01R 43/24
See application file for complete search history.

(56) References Cited

U.S. PATENT DOCUMENTS

| | | | |
|---|---|---|---|
| 6,242,824 B1 * | 6/2001 | Torii | H02K 7/112 29/596 |
| 6,573,625 B2 * | 6/2003 | Shimizu | H02K 5/10 310/239 |
| 6,707,188 B2 * | 3/2004 | Torii | H02K 11/215 310/100 |
| 6,809,454 B2 * | 10/2004 | Adachi | H02K 5/10 310/239 |
| 6,992,414 B2 * | 1/2006 | Thomson | H02K 11/024 310/239 |
| 7,032,290 B2 * | 4/2006 | Hirano | H01R 39/38 29/596 |

(Continued)

FOREIGN PATENT DOCUMENTS

| | | | | |
|---|---|---|---|---|
| JP | 2012139079 A | * | 7/2012 | H02K 13/00 |
| JP | 2012-244851 | | 12/2012 | |

*Primary Examiner* — Burton Mullins
(74) *Attorney, Agent, or Firm* — Patterson Thuente Pedersen, P.A.

(57) ABSTRACT

A brush holder is held between a flange of a yoke housing and a gear housing of a speed reduction unit and fastened by a fastening screw. A link of the brush holder is located between a screw fastening portion of the flange and a screw fastening portion of the gear housing. A connector is linked to a holder main body by the link. The link includes a screw insertion hole and first and second bridges. A metal terminal, which electrically connects the holder main body and the connector, is embedded in each of the first and second bridges.

7 Claims, 4 Drawing Sheets

(56) References Cited

U.S. PATENT DOCUMENTS

| | | | |
|---|---|---|---|
| 7,417,352 B2* | 8/2008 | Hirano | H01R 39/38 310/239 |
| 7,791,243 B2* | 9/2010 | Mizutani | H01R 39/385 310/238 |
| 8,129,879 B2* | 3/2012 | Uchimura | H02K 5/148 310/239 |

* cited by examiner

MOTOR AND METHOD FOR MANUFACTURING MOTOR

RELATED APPLICATION

This application claims benefit of priority of Japanese Application No. 2013-193151, filed Sep. 18, 2013, said application being hereby fully incorporated herein by reference.

BACKGROUND

The present invention relates to a motor incorporating a speed reduction mechanism and including a brush holder and a method for manufacturing the motor.

Japanese Laid-Open Patent Publication No. 2012-244851 describes prior art example of a motor incorporating a speed reduction mechanism that includes a motor main body, which includes a yoke housing, and a speed reduction unit, which includes a gear housing. When a resin brush holder is held between a flange of the yoke housing and the gear housing, screws tightly fasten a screw fastening portion of the flange and a fastening portion of the gear housing. The brush holder includes a holder main body that holds a power supplying brush, a connector used for external connection, and a link that links the holder main body and the connector.

There is a need to flatten the profile of such a motor in the direction orthogonal to the axial direction. Therefore, the connector of the brush holder extends in the same direction as the direction in which the screw fastening portions of the flange and the gear housing extend. That is, the link, which links the holder main body and the connector, is located between the screw fastening portions. Thus, a slot is formed in the link to avoid the screw. This narrows the link and lowers the rigidity of the brush holder.

SUMMARY

It is an object of the present invention to provide a motor that flattens the profile of the motor in a direction orthogonal to the axial direction and improves the rigidity of the brush holder at the link between the holder main body and the connector and to provide a method for manufacturing a motor.

To achieve the above object, a motor according to one aspect of the present invention includes a motor main body, a speed reduction unit, and a brush holder. The motor main body includes a yoke housing including a flange. The flange includes a screw fastening portion. The speed reduction unit includes a gear housing. The gear housing includes a screw fastening portion. The brush holder is formed from a resin. The brush holder is held between the flange and the gear housing and fastened by a fastening screw. The brush holder includes a holder main body that holds a power supplying brush, a link extending from the holder main body so that the link is located between the screw fastening portion of the flange and the screw fastening portion of the gear housing, and a connector linked to the holder main body by the link and used for external connection. The link includes a screw insertion hole, through which the fastening screw is inserted, and first and second bridges arranged at opposite sides of the screw insertion hole. The first and second bridges connect the holder main body and the connector. A metal terminal, which electrically connects the holder main body and the connector, is embedded in each of the first and second bridges.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

One embodiment of a motor will now be described.

Figure 1:
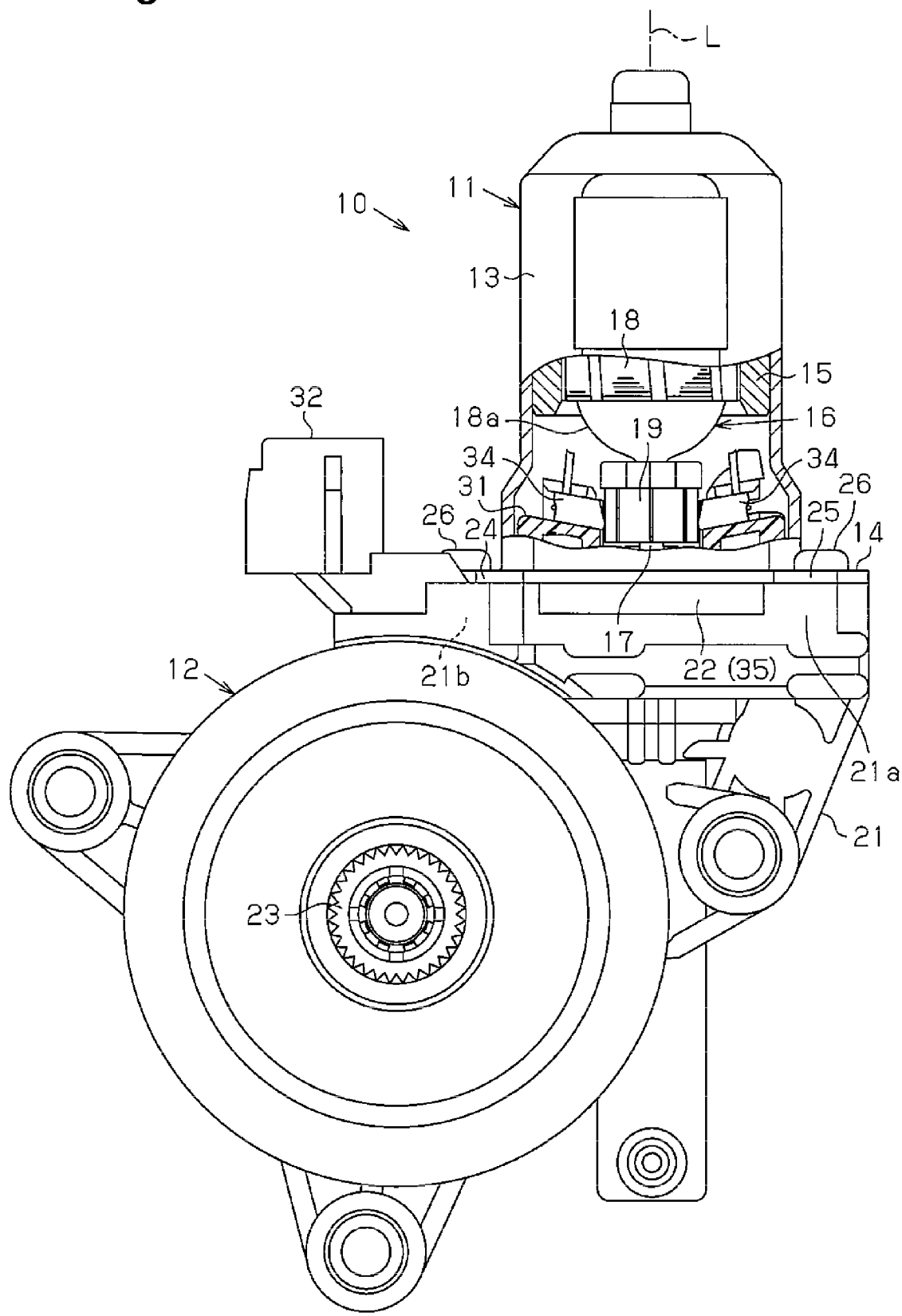
FIG. 1 is a front view showing a motor according to one embodiment of the present invention.

As shown in FIG. 1, a motor 10 of the present embodiment is used as a driving source for a vehicle power window. The motor 10 includes a motor main body 11 and a speed reduction unit 12, which reduces the rotation speed of the motor main body 11.

A yoke housing 13 of the motor main body 11 includes a cylindrical main body, a closed end, an open end, and a flange 14. The flange 14 extends from the open end toward the outer side in the radial direction. The flange 14 is flat and orthogonal to the axial direction. A field magnet 15 is fixed to the inner circumference surface of the yoke housing 13. A rotor 16 is located at the inner side of the field magnet 15.

A rotor core 18 and a commutator 19 are fixed to a rotation shaft 17 of the rotor 16 so that the rotor core 18 and the commutator 19 are rotatable integrally with each other. A winding wire 18a is wound around the rotor core 18. An end of the winding wire 18a is connected to the commutator 19. In the yoke housing 13, the rotor core 18 is opposed to the field magnet 15 in the radial direction. A distal end of the rotation shaft 17 projects out of the yoke housing 13 through the open end of the yoke housing 13, that is, the end of the yoke housing 13 where the flange 14 is arranged.

A gear housing 21 of the speed reduction unit 12 is fixed to the flange 14 of the yoke housing 13 with a resin brush holder 22 held in between. A speed reduction mechanism (not shown), which reduces the rotation speed of the rotation shaft 17, is accommodated in the gear housing 21. An output gear 23 is rotatably supported by the gear housing 21. The speed reduction mechanism transmits the rotation of the rotation shaft 17 to the output gear 23. The output gear 23 is coupled to a vehicle window glass by a window regulator (not shown).

Figure 2A:
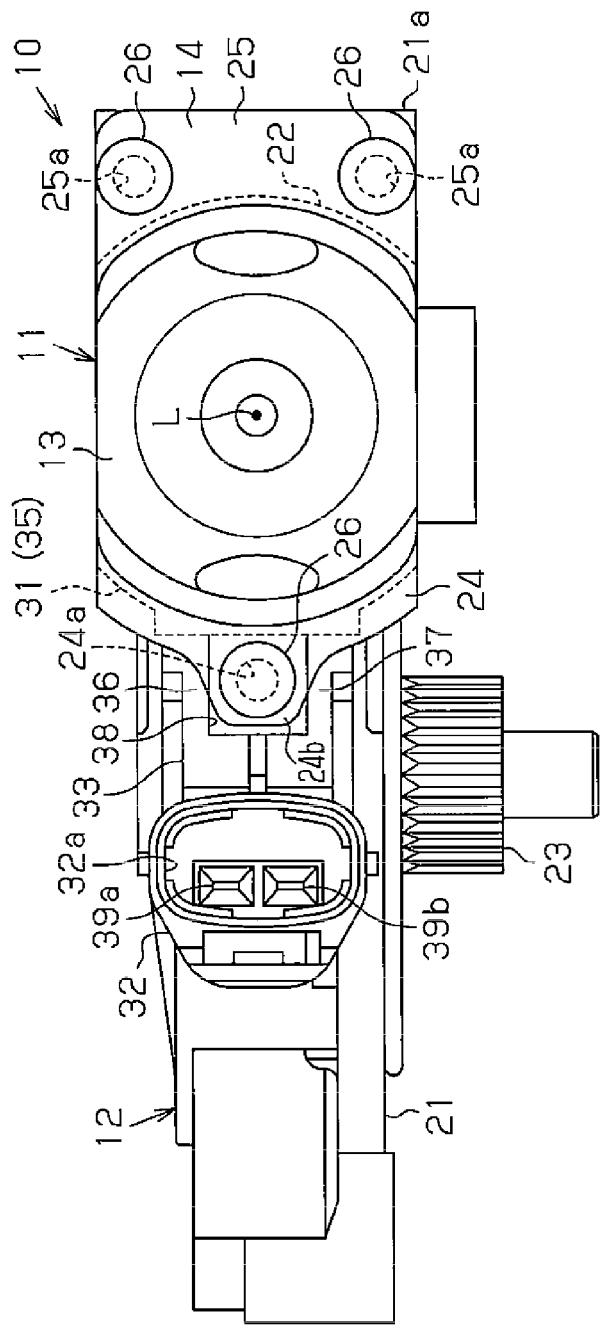
FIG. 2A is a plan view showing the motor of FIG. 1.

As shown in FIG. 2A, the yoke housing 13 and the gear housing 21 function as a case of the motor 10. The case is flat and thin in the direction orthogonal to the axis L of the rotation shaft 17 (up-down direction in FIG. 2A). Hereinafter, when viewing the motor 10 from above, the direction in which the long sides extend (left-right direction in FIG. 2A) is referred to as the motor longitudinal direction, and the direction in which the short sides extend (up-down direction in FIG. 2A) is referred to as the motor lateral direction. The axial direction (direction of the axis L), the longitudinal direction, and the lateral direction of the motor 10 are orthogonal to one another.

The flange 14 includes a first extension 24 and a second extension 25 extending from the two sides of the cylindrical main body in the motor longitudinal direction. The first extension 24 includes one through hole 24a in the central portion in the motor lateral direction. The second extension 25 includes two through holes 25a. The through holes 25a are arranged in the second extension 25 proximate to the two edges in the motor lateral direction. Fastening screws 26 are inserted through the through holes 24a and 25a and fastened to a yoke attachment 21a of the gear housing 21.

The brush holder 22 includes a holder main body 31, a connector 32 used for external connection, and a link 33 located between the holder main body 31 and the connector 32.

As shown in FIG. 1, a portion of the holder main body 31 is fitted in the yoke housing 13. The holder main body 31 holds a power supplying brush 34, which contacts the commutator 19.

Figure 2B:
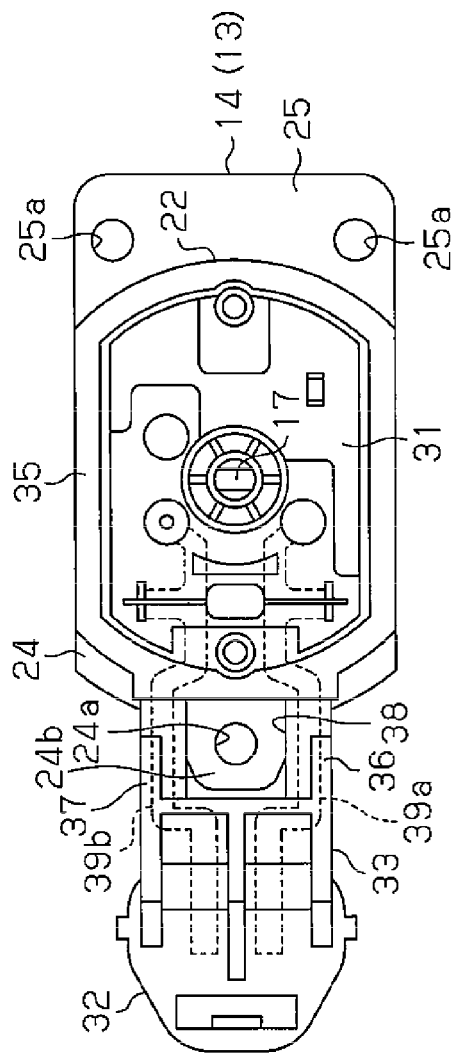
FIG. 2B is a plan view showing a yoke housing and a brush holder in the motor of FIG. 1 as viewed from a gear housing.

As shown in FIG. 2B, the holder main body 31 is shaped in correspondence with the flat shape of the yoke housing 13. An elastomeric seal member 35 is formed integrally with the outer circumferential edge of the holder main body 31. The seal member 35 is held between the flange 14 of the yoke housing 13 and the yoke attachment 21a of the gear housing 21 in the axial direction. The seal member 35 is attached to the flange 14 and the yoke attachment 21a and compressed by the fastening force of the fastening screw 26. This seals the opening of the yoke housing 13 and the yoke attachment 21a in a liquid-tight manner. A bearing (not shown), which axially supports the rotation shaft 17, is arranged in the center of the holder main body 31.

The link 33 of the brush holder 22 extends from the holder main body 31 so that the link 33 of the brush holder 22 is located between a screw fastening portion 24b of the first extension 24 and a screw fastening portion 21b of the yoke attachment 21a. More specifically, the link 33 includes a first bridge 36 and a second bridge 37, which connect the holder main body 31 and the connector 32. The first and second bridges 36 and 37 extend from the holder main body 31 in the motor longitudinal direction that is the same as the direction in which the first extension 24 extends from the main body of the yoke housing. The first and second bridges 36 and 37 are located at opposite sides in the motor lateral direction. The first and second bridges 36 and 37 are covered by the seal member 35 extending from the holder main body 31.

A screw insertion hole 38, through which the fastening screw 26 of the first extension 24 is inserted, is arranged between the first and second bridges 36 and 37. The screw insertion hole 38 is arranged in the laterally central portion (central portion in the motor lateral direction) of the link 33. That is, the first and second bridges 36 and 37 have the same length in the motor lateral direction. The screw insertion hole 38 is tetragonal as viewed in the axial direction.

The connector 32, which is integrally connected to the holder main body 31 by the first and second bridges 36 and 37, is located beside the yoke housing 13 in the motor longitudinal direction.

Two power supplying terminals 39a and 39b, which are power terminals, are insert-molded and embedded in the brush holder 22. Portions of the power supplying terminals 39a and 39b close to the holder main body 31 are electrically connected to the power supplying brush 34. One of the power supply terminals 39a is laid out from the holder main body 31 through the first bridge 36 to the connector 32. The other one of the power supply terminals 39b is laid out from the holder main body 31 through the second bridge 37 to the connector 32.

The connector 32 includes an external connection opening 32a, which upwardly opens in the axial direction. The ends of the power supply terminals 39a and 39b close to the connector 32 are exposed to the space in the external connection opening 32a. The power supply terminals 39a and 39b are electrically connected to an external connector (not shown), which is fitted to the external connection opening 32a in the axial direction. This allows for power supply to the power supplying brush 34 from the external connector through the power supply terminals 39a and 39b.

The brush holder 22 is molded as follows. First, injection molding is performed to integrally mold the power supply terminals 39a and 39b, which serves as inserts, with the brush holder (insert molding step). The power supply terminals 39a and 39b are connected to each other by a connecting portion (not shown). The connecting portion connecting the power supply terminals 39a and 39b is located at a position corresponding to the screw insertion hole 38 of the link 33.

Subsequently, the connecting portion exposed in the screw insertion hole 38 of the link 33 is cut. This electrically insulates the power supply terminals 39a and 39b from each other (connecting portion cutting step).

Then, the seal member 35 is formed from the outer circumferential edge of the holder main body 31 to the first and second bridges 36 and 37. The cut location of the connecting portion is covered by the seal member 35, which covers the first and second bridges 36 and 37. Thus, the cut location of the connecting portion is not exposed in the screw insertion hole 38.

The operation of the present embodiment will now be described.

The first and second extensions 24 and 25 (flange 14) of the yoke housing 13 are fastened to the gear housing 21 by the fastening screws 26. The first and second extensions 24 and 25 extend in the motor longitudinal direction. The connector 32 of the brush holder 22 is located at a position separated from the yoke housing 13 in the same direction as the direction in which the first extension 24 (screw fastening portion 24b) extends from the yoke housing 13. This flattens the motor 10 in the direction orthogonal to the axis.

The holder main body 31 is coupled to the connector 32 by the first and second bridges 36 and 37 arranged at the two sides of the screw insertion hole 38 in the motor lateral direction. This improves the rigidity of the link 33 as compared with a structure that has a slot in the link 33 between the holder main body 31 and the connector 32 to avoid interference with the screw. That is, the rigidity of the link 33 is improved as compared with a structure that connects the holder main body 31 and the connector 32 at a single location. Additionally, the metal power supply terminals 39a and 39b are respectively embedded in the first and second bridges 36 and 37. This further improves the rigidity of the first and second bridges 36 and 37.

In the present embodiment, the through hole 24a, into which the fastening screw 26 is inserted, is formed in the center of the first extension 24 (flange 14) in the motor lateral direction. Thus, the yoke housing 13 is symmetric in the motor lateral direction. This allows the yoke housing 13 to be applied to brush holders having different structures without changing the shape of the yoke housing 13. For example, in a vehicle power window device, without changing the shape of the yoke housing 13, the yoke housing 13 may be applied to a brush holder including connectors that can be connected in any one of two opposite motor lateral directions in correspondence with the driver seat side and the passenger seat side (right and left sides). This improves the versatility of the yoke housing 13.

The present embodiment has the advantages described below.

(1) The link 33 of the brush holder 22 includes the screw insertion hole 38, through which the fastening screw 26 is inserted, and the first and second bridges 36 and 37, which are located at opposite sides of the screw insertion hole 38. The first and second bridges 36 and 37 connect the holder main body 31 and the connector 32. In this manner, the connector 32 extends from the holder main body 31 in the same direction as the direction in which the screw fastening portion 24b (first extension 24) extends from the yoke housing 13. This improves the rigidity of the link 33 while flattening the motor 10 in the direction orthogonal to the axis. Further, in the present embodiment, the power supply terminals 39a and 39b (metal terminals), which electrically connect the holder main body 31 and the connector 32, are respectively embedded in the first and second bridges 36 and 37. This improves the rigidity of the first and second bridges 36 and 37. Consequently, the rigidity of the link 33 may be further improved.

(2) The screw insertion hole 38 of the brush holder 22 is arranged in the laterally central portion (central portion in the motor lateral direction) of the link 33. This structure allows the first and second bridges 36 and 37 to have the same width. Thus, the rigidity of the link 33 may be improved in a well-balanced manner. The screw insertion hole 38 and the through hole 24a are located in the laterally central portion of the first extension 24 (flange 14). Thus, the yoke housing 13, which includes the through hole 24a that is located at the same position, is applicable to various types of the brush holder 22 including the connector 32 that can be connected in different directions. This is advantageous for improving the versatility of the yoke housing 13.

(3) The metal terminals embedded in the first and second bridges 36 and 37 are the power supply terminals 39a and 39b, which are power terminals that supply current to the power supplying brush 34. More specifically, the power supply terminals 39a and 39b, which have relatively large cross-sectional areas, are embedded in the first and second bridges 36 and 37. This further improves the rigidity of the first and second bridges 36 and 37.

(4) The brush holder 22 is insert-molded. Then, the connecting portion, which connects the power supply terminals 39a and 39b, is cut through the screw insertion hole 38. This prevents displacement of the power supply terminals 39a and 39b embedded in the brush holder 22. Additionally, the screw insertion hole 38 of the brush holder 22 also serves as a hole used when cutting the connecting portion. This simplifies the structure of the brush holder 22. Additionally, the cut location of the connecting portion is covered with the seal member 35, which covers the first and second bridges 36 and 37. Thus, the cut location of the connecting portion is not exposed in the screw insertion hole 38.

The above embodiment may be modified as described below.

Figure 3:
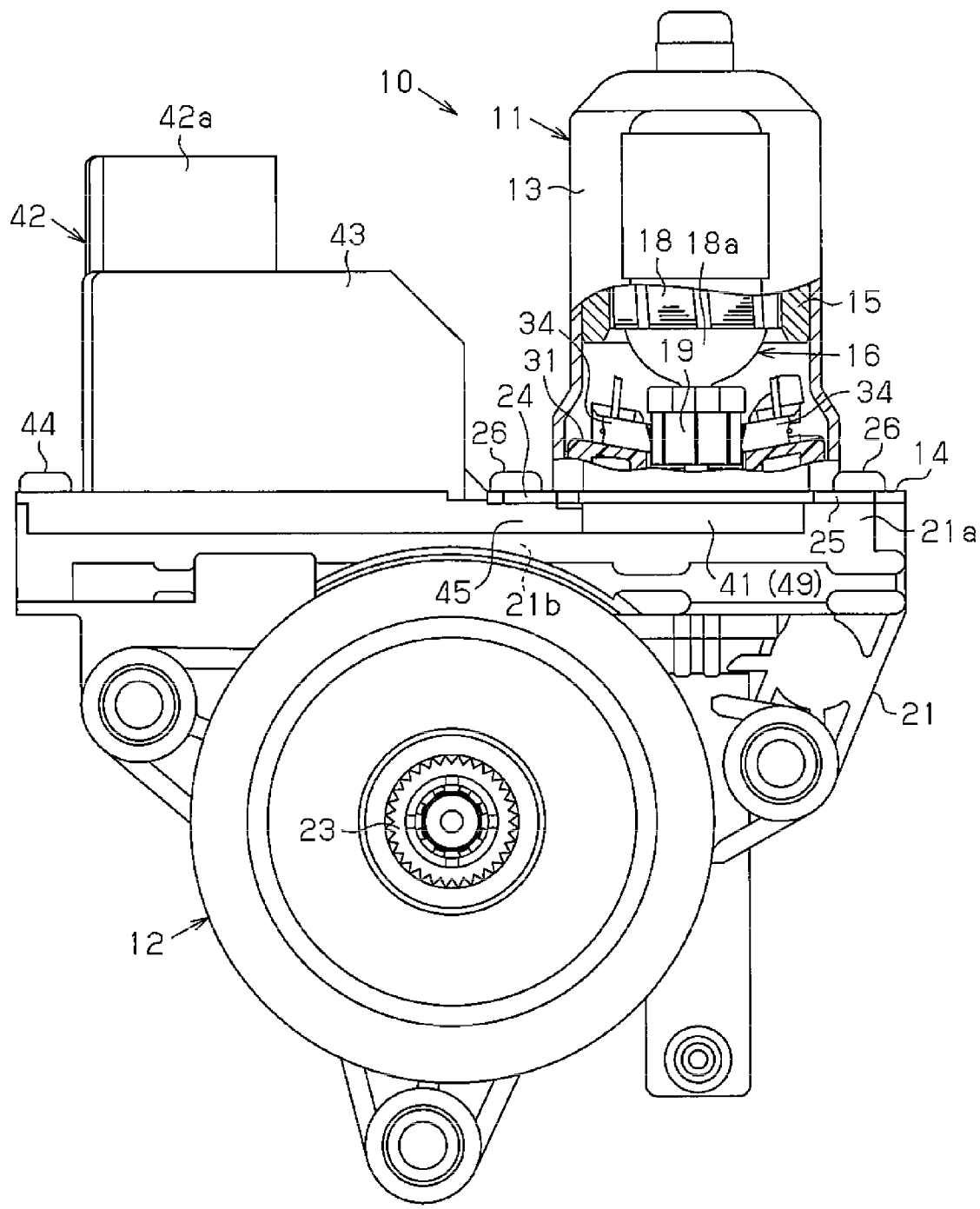
FIG. 3 is a front view showing a motor of one example.
Figure 4A:
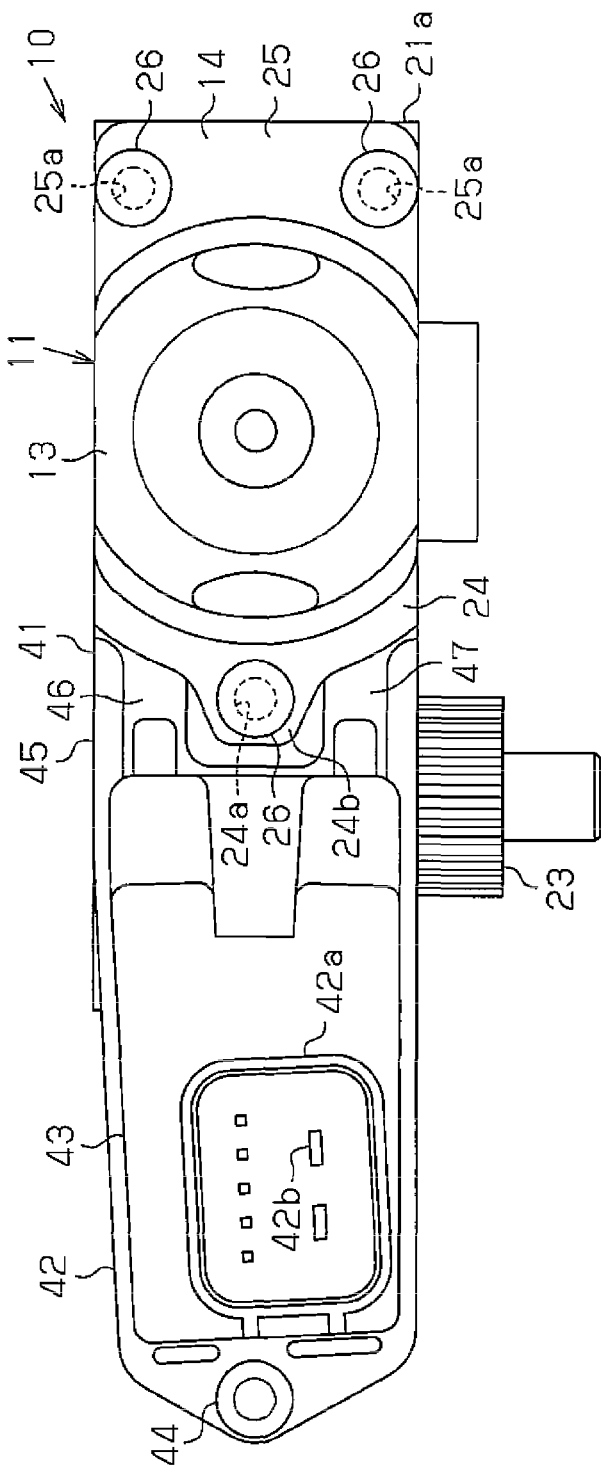
FIG. 4A is a plan view showing the motor of FIG. 3.
Figure 4B:
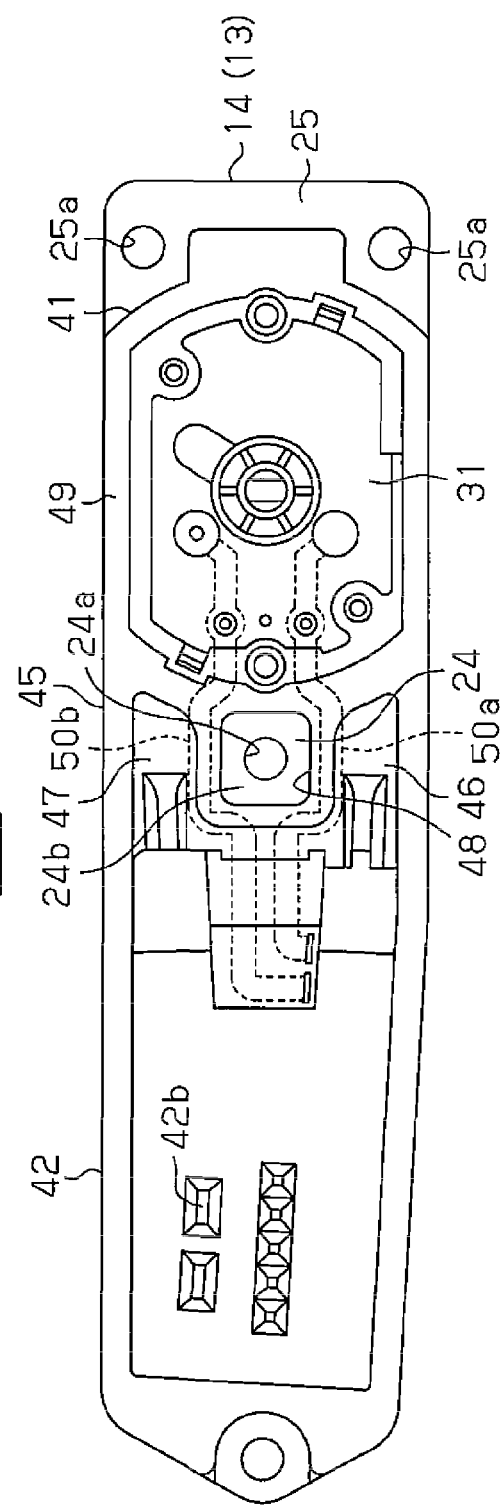
FIG. 4B is a plan view showing a yoke housing and a brush holder in the motor of FIG. 3 as viewed from a gear housing.

The brush holder 22 of the above embodiment may be modified, for example, to a brush holder 41 shown in FIGS. 3 to 4B.

A connector 42 of the brush holder 41 is integrated with a board accommodation housing 43. The board accommodation housing 43 extends from the holder main body 31 in the motor longitudinal direction that is the same direction as the direction in which the first extension 24 extends from the yoke housing 13. The board accommodation housing 43 accommodates a control circuit board (not shown), which controls the driving of the motor 10. The control circuit board is arranged to extend in a direction generally orthogonal to the motor lateral direction. An end portion of the connector 42 in the motor longitudinal direction is fastened to the gear housing 21 by a screw 44.

As shown in FIGS. 3 and 4A, an external connecting portion 42a, which opens upwardly in the axial direction, is defined on the axially upper end surface (end surface opposing to gear housing) of the board accommodation housing 43. The external connecting portion 42a includes a plurality of connection terminals 42b. One end of the connection terminal 42b is connected to the control circuit board, and the other end of the connection terminal 42b is exposed in the external connecting portion 42a. Each of the connection terminals 42b is electrically connected to an external connector (not shown), which is connected to the external connecting portion 42a. As shown in FIG. 4A, due to spatial limitations imposed on the layout of the motor, a laterally end surface, that is, the upper end surface in FIG. 4A, of the board accommodation housing 43 is tilted with respect to the motor longitudinal direction.

As shown in FIG. 4B, the brush holder 41 includes a link 45 arranged between the holder main body 31 and the connector 42. The link 45 extends from the holder main body 31 so that the link 45 is located between the screw fastening portion 24b of the first extension 24 (flange 14) and the screw fastening portion 21b of the yoke attachment 21a. More specifically, the link 45 includes first and second bridges 46 and 47, which connect the holder main body 31 and the connector 42. The first and second bridges 46 and 47 extend from the holder main body 31 in the motor longitudinal direction that is the same direction as the direction in which the first extension 24 extends from the main body of the yoke housing. The first and second bridges 46 and 47 are arranged facing each other in the motor lateral direction.

A screw insertion hole 48, through which the fastening screw 26 of the first extension 24 is inserted, is arranged between the first and second bridges 46 and 47. The screw insertion hole 48 is arranged in the laterally central portion (central portion in the motor lateral direction) of the link 45. That is, the first and second bridges 46 and 47 have the same length in the motor lateral direction. The screw insertion hole 48 is tetragonal as viewed in the axial direction.

An elastomeric seal member 49, which seals the openings of the yoke housing 13 and the yoke attachment 21a, is integrated with the brush holder 41. The seal member 49 is arranged in the outer circumferential edge of the holder main body 31, the inner circumferential edge, and the circumferential portion of the axially lower end (end that is closer to gear housing 21) of the board accommodation housing 43.

Two power supply terminals 50a and 50b, which are power terminals, are insert-molded and embedded in the brush holder 41. The power supplying brush 34 (refer to FIG. 3) is electrically connected to the power supply terminals 50a and 50b at portions closer to the holder main body 31. One of the power supply terminals 50a is laid out from the holder main body 31 through the first bridge 46 to the connector 42. The other one of the power supply terminals 50b is laid out from the holder main body 31 through the second bridge 47 to the connector 42.

In the same manner as the above embodiment, when the brush holder 41 undergoes insert molding, the power supply terminals 50a and 50b are connected to each other by the connecting portion. After the insert molding, the connecting portion is cut through the screw insertion hole 38. The cut location of the connecting portion is covered with the seal member 49 arranged in the inner circumferential edge of the screw insertion hole 38.

The structure shown in FIGS. 3 and 4 obtains the same advantages as the above embodiment.

In the above embodiment and the example shown in FIGS. 3 and 4, the metal terminals embedded in the first and second bridges 36 and 37 (first and second bridges 46 and 47) are used as the power supply terminals 39a and 39b (power supply terminals 50a and 50b), which supply current to the power supplying brush 34. Terminals other than the power supply terminals 39a and 39b may be embedded in the first and second bridges 36 and 37 (first and second bridges 46 and 47).

In the above embodiment and the example shown in FIGS. 3 and 4, the screw insertion hole 38 (screw insertion hole 48) is arranged in the central portion of the link 33 (link 45) in the motor lateral direction. The screw insertion holes 38 and 48 do not have to be arranged in the laterally central portions of the links 33 and 45 as long as the first bridges 36 and 46 and the second bridges 37 and 47 are included.

The invention claimed is:

1. A motor comprising:
    a motor main body that includes a yoke housing including a flange, wherein the flange includes a screw fastening portion;
    a speed reduction unit that includes a gear housing, wherein the gear housing includes a screw fastening portion; and
    a resin brush holder held between the flange and the gear housing and fastened by a fastening screw, wherein the brush holder includes
        a holder main body that holds a power supplying brush,
        a link extending from the holder main body so that the link is located between the screw fastening portion of the flange and the screw fastening portion of the gear housing, and
        a connector linked to the holder main body by the link and used for external connection, wherein
    the link includes a screw insertion hole, through which the fastening screw is inserted, and first and second bridges arranged at opposite sides of the screw insertion hole,
    the first and second bridges connect the holder main body and the connector, and
    a metal terminal, which electrically connects the holder main body and the connector, is embedded in each of the first and second bridges.

2. The motor according to claim 1, wherein the screw insertion hole is located in a laterally central portion of the link.

3. The motor according to claim 1, wherein each of the metal terminals is a power terminal, which supplies current to the power supplying brush.

4. The motor according to claim 1, wherein the first and second bridges have the same length.

5. The motor according to claim I, wherein the first and second bridges are covered by a seal member extending from the holder main body.

6. A method for manufacturing the motor according to claim 1, the method comprising:
    injection-molding the brush holder integrally with the metal terminals, which serve as inserts, wherein the metal terminals are connected to each other by a connecting portion; and
    cutting the connecting portion exposed in the screw insertion hole subsequent to the injection-molding.

7. The method for manufacturing the motor according to claim 6, wherein a cut location of the connecting portion is covered by a seal member.

* * * * *